(12) United States Patent
Carvalho

(10) Patent No.: US 7,513,552 B2
(45) Date of Patent: Apr. 7, 2009

(54) TRANSFORMABLE TAIL GATE FOR TRUCK BED

(76) Inventor: Evandro Carvalho, 5521 SW. 20th St., Hollywood, FL (US) 33023

( * ) Notice: Subject to any disclaimer, the term of this patent is extended or adjusted under 35 U.S.C. 154(b) by 363 days.

(21) Appl. No.: 11/448,396

(22) Filed: Jun. 7, 2006

(65) Prior Publication Data
US 2007/0284904 A1 Dec. 13, 2007

(51) Int. Cl.
*B62C 1/06* (2006.01)
(52) U.S. Cl. ................................. 296/26.09
(58) Field of Classification Search .............. 296/57.1, 296/26.08, 26.09, 26.1, 26.11, 50, 51, 61, 296/39.2
See application file for complete search history.

(56) References Cited

U.S. PATENT DOCUMENTS

| | | | |
|---|---|---|---|
| 2,852,303 A | 9/1958 | Hopson | |
| 3,642,156 A | 2/1972 | Stenson | |
| 4,624,619 A | 11/1986 | Uher | |
| 4,990,049 A * | 2/1991 | Hargrove | 414/537 |
| 5,199,150 A | 4/1993 | Mortenson | |
| 5,244,335 A | 9/1993 | Johns | |
| 5,312,149 A | 5/1994 | Boone | |
| 5,393,192 A | 2/1995 | Hall et al. | |
| 5,468,038 A | 11/1995 | Sauri | |
| 5,795,125 A | 8/1998 | Walkden | |
| 5,829,945 A | 11/1998 | Stanley | |
| 5,934,863 A | 8/1999 | Beck | |
| 6,042,923 A * | 3/2000 | Lewis | 428/68 |
| 6,089,816 A | 7/2000 | Christ | |
| 6,880,194 B2 * | 4/2005 | O'Donnell et al. | 14/69.5 |
| 7,128,357 B1 * | 10/2006 | Carroll | 296/61 |
| 7,240,939 B2 * | 7/2007 | Vandekerkhof et al. | 296/26.09 |
| 7,401,833 B2 * | 7/2008 | Dryja | 296/62 |
| 2002/0098071 A1 | 7/2002 | Henderson | |
| 2005/0281654 A1 | 12/2005 | Ehler | |
| 2006/0284439 A1 * | 12/2006 | Carroll | 296/61 |
| 2008/0042464 A1 * | 2/2008 | Hutchins et al. | 296/61 |

* cited by examiner

*Primary Examiner*—H Gutman
(74) *Attorney, Agent, or Firm*—Mark P. Terry, Esq.; Carey, Rodriguez, Greenberg & Paul, LLP

(57) ABSTRACT

A system for facilitating loading and placement of materials onto a truck bed is disclosed. The system includes a hollow planar element disposed on a truck bed. The system further includes a hollow tail gate element having a first end and a second end, wherein the hollow tail gate element is hingably coupled on the first end to the hollow planar element. The system further includes an inner planar element positioned within the hollow planar element. The system further includes an inner tail gate element positioned within the hollow tail gate element, wherein the inner tail gate element is hingably coupled to the inner planar element. The inner tail gate element may be slid partially out of the second end of the hollow tail gate element so as to extend the truck bed when the hollow tail gate element is coplanar with the hollow planar element.

12 Claims, 8 Drawing Sheets

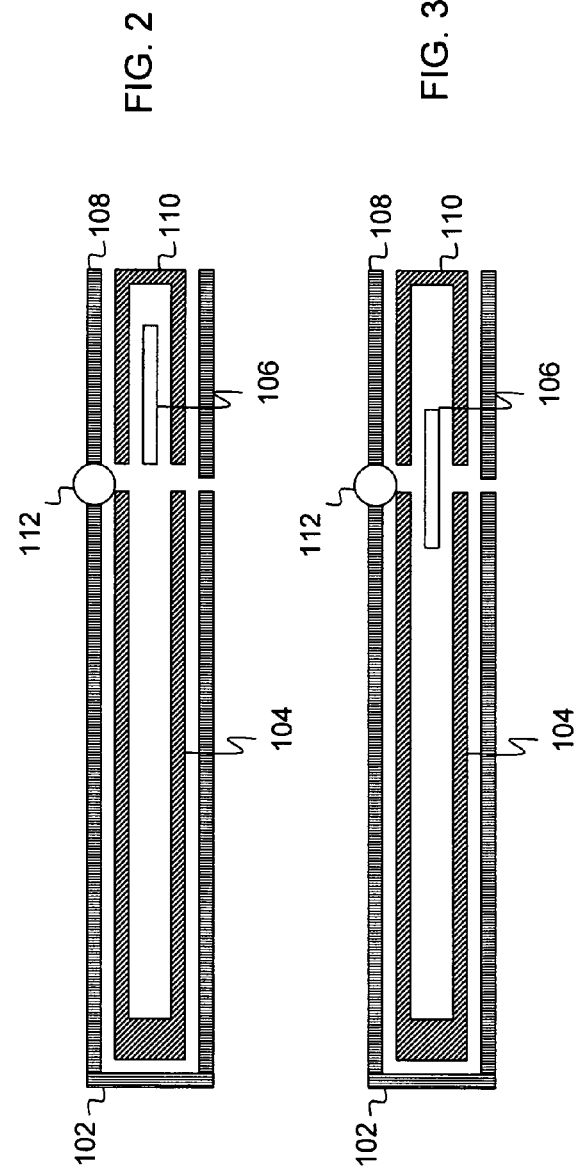

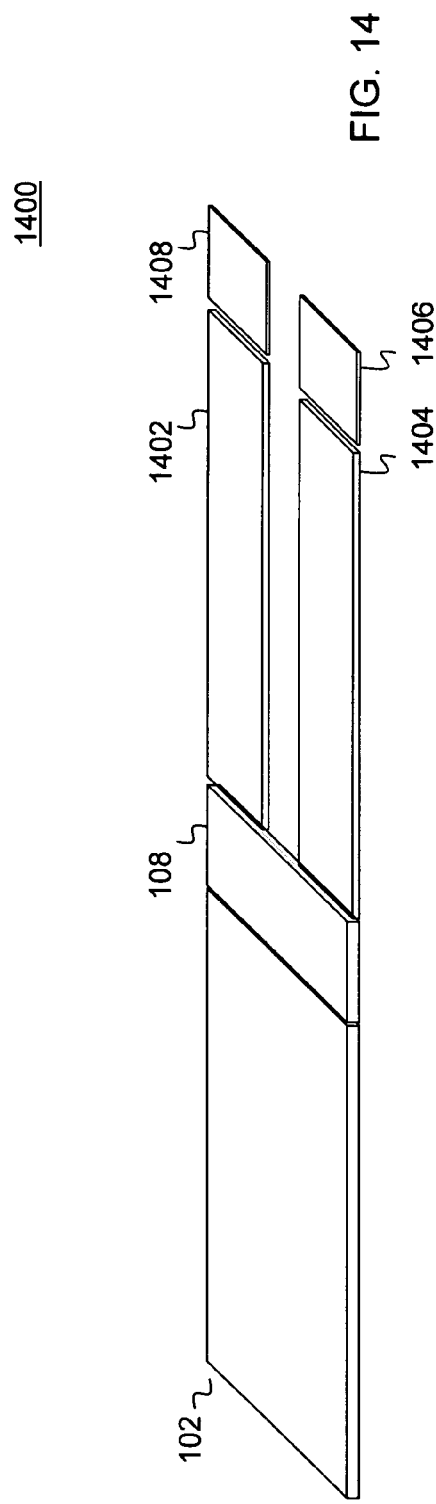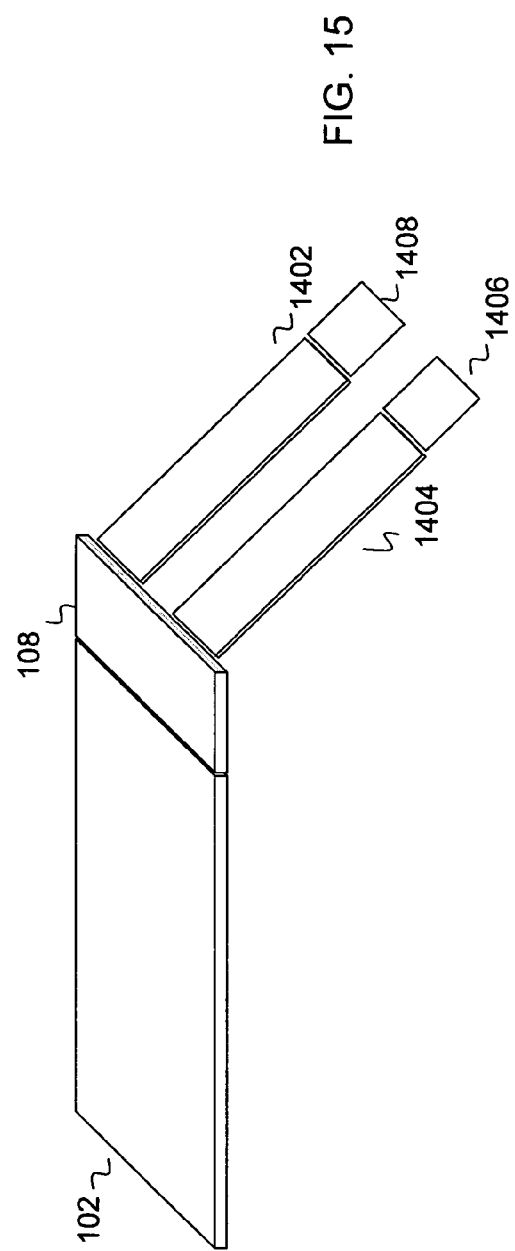

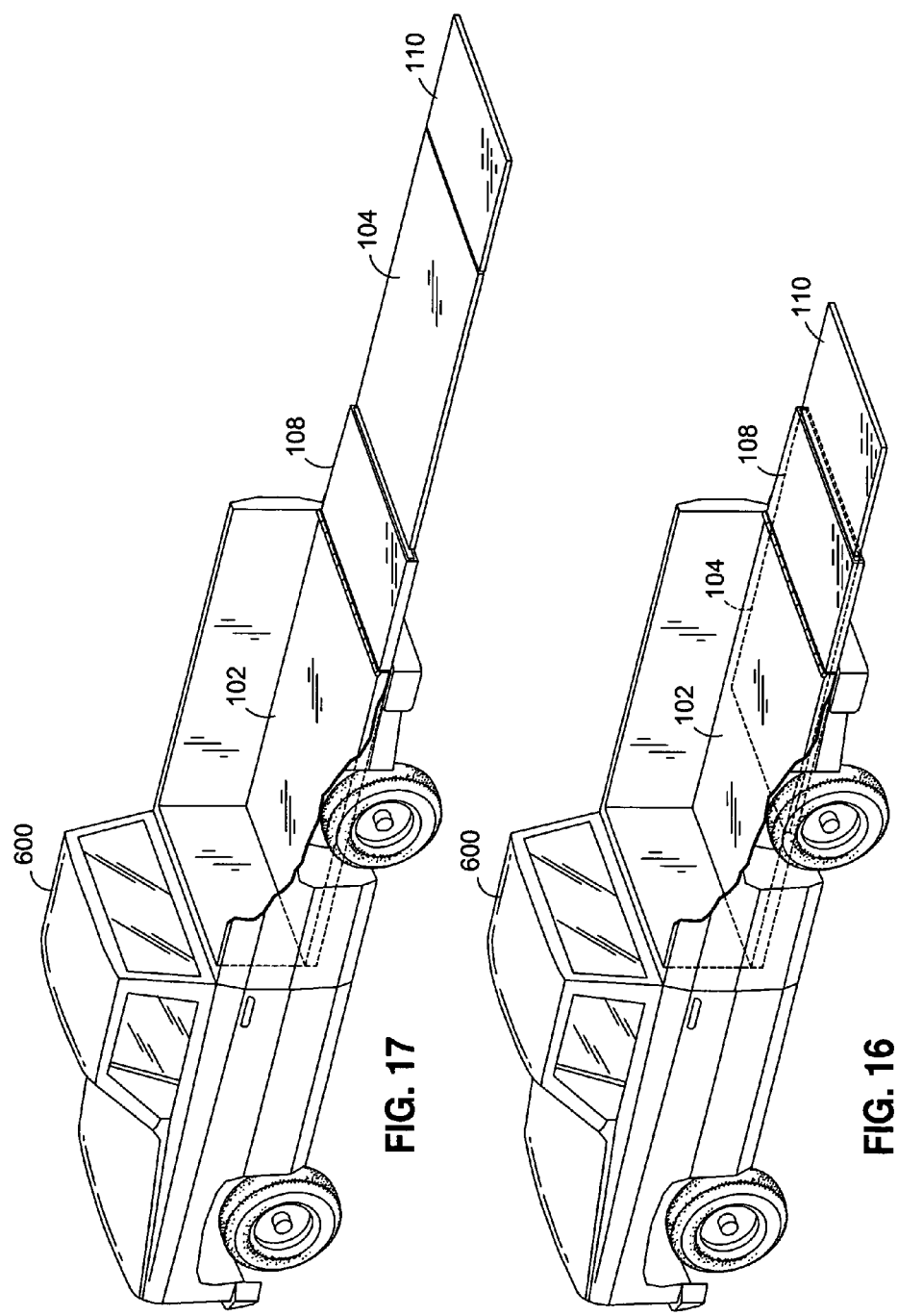

TRANSFORMABLE TAIL GATE FOR TRUCK BED

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates to tail gates for truck beds, and more particularly to tail gates that assist in loading materials onto truck beds.

BACKGROUND OF THE INVENTION

Among users of pick up trucks and other vehicles with a truck bed, there is often a need for a simple, inexpensive ramp and/or truck bed extender, free from mechanical difficulties. The transportation of long, heavy items, such as motorcycles and wooden beams, is common for users of pick up trucks and vehicles with truck beds. Therefore, a retractable ramp and/or truck bed extender that is operable by a single person is beneficial for users who desire to transport heavy articles or articles having a length greater than the truck bed. Moreover, it is desirable to minimize the modifications necessary to provide a pick up truck or related vehicle with the ramp or truck bed extender.

U.S. Pat. No. 3,870,170 issued to Noble, and entitled: "Loading Ramp for Pick-Up Trucks and the Like" discloses a raised platform in a complex design comprising fixed tracks, movable tracks, a gang plank and rollers. Noble's movable tracks provide a continuous horizontal trackway from the front end of the ramp storage compartment to the rear edge of an opened tailgate. Both Noble's ramp and movable tracks can be retracted far enough so that both the ramp door at the rear end of the raised platform assembly, and the tailgate, may be closed to preserve the exterior appearance of the pick-up truck. The Noble disclosure does not, however, describe a ramp that is particularly easy to use and simple to implement and install. The Noble disclosure seems to pick up trucks, station wagons, etc.

Further, previous approaches include loading ramps which extend rearwardly and downwardly from the rear edge of the pick up truck body such that items with greater length, such as a motorcycle, can be easily loaded. These solutions also provide a walkway to provide access to the pick up truck body. However, these solutions do not provide a retractable ramp and truck bed extender that can be stored within the confines of the truck bed when not in use. In addition, these approaches do not provide simple and easy to use mechanisms that are meant for release to the mainstream pick up truck user.

Additionally, in the use of many vehicles, particularly a smaller vehicle such as a pick up truck, it is normally not convenient to transport a ramp for use. Thus, it would be desirable to have a convenient means for transporting a ramp for use with a vehicle such as a truck or pick up truck. Also, when using vehicles to transport heavy loads, it is often desirable to transport objects that extend beyond the normal tail gate length and which cannot be adequately supported because they extend beyond the end of the tail gate. Thus, it would be useful to have a means for supporting loads which extend beyond the normal tail gate of a truck or similar vehicle.

While the foregoing prior art recognize the need for simple and easy to use systems for loading and placing materials onto a truck bed, the proposed solutions set forth complex and costly systems. Therefore, a need exists to overcome the problems with the prior art as discussed above, and particularly for a more efficient system for assisting the loading and placement of materials onto a truck bed via a tail gate.

SUMMARY OF THE INVENTION

Briefly, according to an embodiment of the present invention, a system for facilitating loading and placement of materials onto a truck bed is disclosed. The system includes a hollow planar element disposed on a truck bed. The system further includes a hollow tail gate element having a first end and a second end, wherein the hollow tail gate element is hingably coupled on the first end to the hollow planar element. The system further includes an inner planar element positioned within the hollow planar element. The system further includes an inner tail gate element positioned within the hollow tail gate element, wherein the inner tail gate element is hingably coupled to the inner planar element. The inner tail gate element may be slid partially out of the second end of the hollow tail gate element so as to extend the truck bed when the hollow tail gate element is coplanar with the hollow planar element.

In another embodiment of the present invention, a system for facilitating loading and placement of materials onto a truck bed is disclosed. The system includes a rectangular planar element having an inner cavity, wherein the rectangular planar element is disposed on a truck bed. The system further includes a tail gate element having an inner cavity and an opening providing access to the inner cavity, wherein the tail gate element is hingably coupled to the rectangular planar element. The system further includes at least one sliding planar element positioned within the rectangular planar element. The system further includes a first sliding tail gate element positioned within the tail gate element, wherein the first sliding tail gate element is hingably coupled to at least one sliding planar element. The first sliding tail gate element may be slid partially out of the opening of the tail gate element so as to extend the truck bed when the tail gate element is coplanar with the rectangular planar element.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 1 is an illustration of a cross-sectional view of a truck bed system, according to one embodiment of the present invention.

FIG. 2 is an illustration of a cross-sectional view of the truck bed system of FIG. 1 in an open position.

FIG. 3 is an illustration of a cross-sectional view of the truck bed system of FIG. 1 in an open position with the sliding element in place.

FIG. 14 is an illustration of a perspective view of a truck bed system according to one embodiment of the present invention.

FIG. 15 is an illustration of a perspective view of the truck bed system of FIG. 14 in the open position with the inner tail gate element and the inner planar elements pulled out and rotated.

FIG. 16 is an illustration of a perspective view of a truck bed system according to one embodiment of the present invention.

FIG. 17 is an illustration of a perspective view of the truck bed system of FIG. 16 in the open position with the inner tail gate element and the inner planar element pulled out.

DETAILED DESCRIPTION

Figure 4:
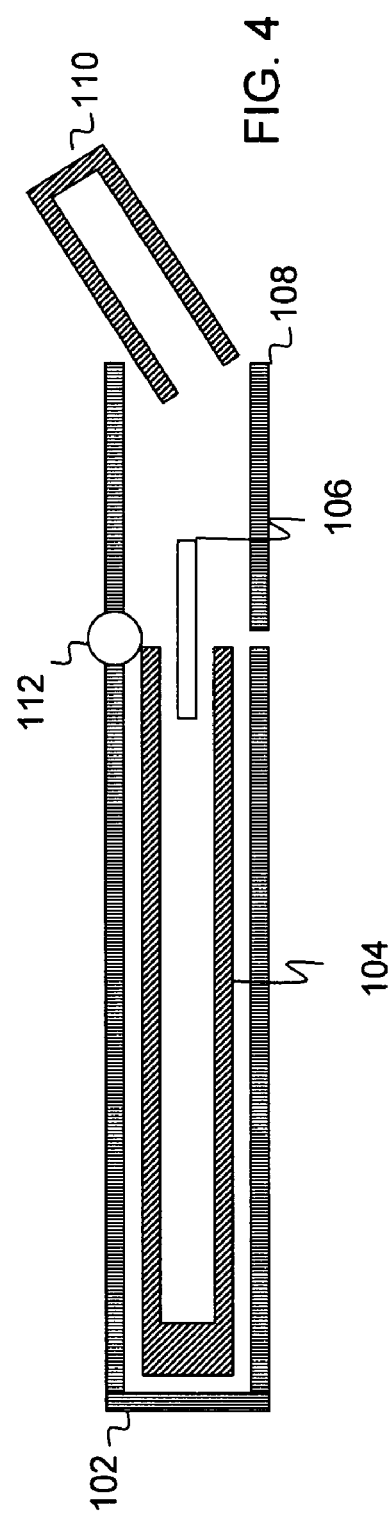
FIG. 4 is an illustration of a cross-sectional view of the truck bed system of FIG. 1 in an open position with the inner tail gate element being pulled out and rotated.

The present invention provides a system for facilitating loading and placement of materials onto a truck bed. The apparatus of the present invention allows a truck bed to be extended using a transformable tail gate, which is stabilized and/or strengthened so as to allow heavy objects to be placed on top of it, namely heavy objects with a length greater than the length of the truck bed. The apparatus of the present invention further allows the truck bed to be extended using a transformable tail gate and an inner tail gate element so as to allow heavy objects to be placed on top of the two, namely heavy objects with a length greater than the truck bed. The apparatus of the present invention further allows the truck bed to be extended using a transformable tail gate with the added benefit of a perpendicular gate. This allows heavy objects to be placed on top of the transformable tail gate element, namely heavy objects with a length greater than the truck bed, while still providing a gate, which acts like a barrier that contains the load being carried. The apparatus of the present invention further provides a completely separate planar assembly that is rotated and used as a ramp for loading materials onto the truck bed.

FIG. 1 is an illustration of a cross-sectional view of a truck bed system 100, according to one embodiment of the present invention. The truck bed system 100 includes a hollow planar element 102 disposed on a truck bed of a vehicle such as a pick up truck. The hollow planar element 102 may be a rectangular metallic element that substantially covers the upwards-facing surface of a truck bed and possesses an inner cavity. The truck bed system 100 further includes a hollow tail gate element 108 having a first end and a second end, wherein the hollow tail gate element 108 is coupled on the first end to the hollow planar element 102 via a hinge 112. The hollow tail gate element 108 may be a rectangular metallic element that substantially emulates a tail gate for a pick up truck and possesses an inner cavity. With regard to hinge 112, the present invention supports any hinge arrangement or coupling apparatus that allows the hollow tail gate element 108 to rotate about the hinge point. In an embodiment of the present invention, hinge 112 comprises any one of butt hinges, continuous hinges, barrel hinges or the like.

The truck bed system 100 further includes an inner planar element 104 positioned within the hollow planar element 102. The inner planar element 104 may be a rectangular metallic element that substantially occupies the inner cavity of the hollow planar element 102. The truck bed system 100 further includes an inner tail gate element 110 positioned within the hollow tail gate element 108. The inner tail gate element 110 may be a rectangular metallic element that substantially occupies the inner cavity of the hollow tail gate element 108. In one embodiment of the present invention, the inner tail gate element 110 is coupled to the inner planar element 104 via a hinge (not shown). In another embodiment of the present invention, a locking mechanism is used to lock the element 104 within element 102 and to lock the elements 106 and 110 within element 108.

FIG. 1 also shows a sliding planar element 106 positioned within the inner tail gate element 110. The truck bed system 100 is shown to be in the closed position as the hollow tail gate element 108 is rotated about hinge 112 so as to be perpendicular to the hollow planar element 102, as when a tail gate is closed.

FIG. 2 is an illustration of a cross-sectional view of the truck bed system 100 of FIG. 1 in an open position. The truck bed system 100 is shown in FIG. 2 to be in the open position as the hollow tail gate element 108 is rotated about hinge 112 so as to be coplanar to the hollow planar element 102, as when a tail gate is open.

FIG. 3 is an illustration of a cross-sectional view of the truck bed system 100 of FIG. 1 in an open position with the sliding planar element 106 in place. FIG. 3 shows a sliding planar element 106 positioned within the inner planar element 104 and the inner tail gate element 110, wherein when the hollow tail gate element 108 is coplanar with the hollow planar element 102, the sliding planar element 106 may be positioned or slid within both the inner planar element 104 and the inner tail gate element 110 so as to provide stability to a junction of the inner planar element 104 and the inner tail gate element 110. This arrangement allows the truck bed to be extended using the hollow tail gate element 108, which is stabilized and/or strengthened so as to allow heavy objects to be placed on top of it, namely heavy objects with a length greater than the length of the truck bed (i.e., the length of the hollow planar element 102).

In one embodiment of the present invention, a locking mechanism is used to lock the element 106 within elements 104 and 110. In another embodiment of the present invention, the interior of elements 104 and 110 include at least one railing or gutter for facilitating sliding of the element 106 within the elements 104 and 110.

FIG. 4 is an illustration of a cross-sectional view of the truck bed system 100 of FIG. 1 in an open position with the inner tail gate element 110 being pulled out and rotated. FIG. 4 shows that the inner tail gate element 110 may be slid partially out of the second end of the hollow tail gate element 108 so as to extend the truck bed when the hollow tail gate element 108 is coplanar with the hollow planar element 102. The inner tail gate element 110 may further be pulled out and rotated. This arrangement allows the truck bed to be extended using the hollow tail gate element 108 and the inner tail gate element 110 so as to allow heavy objects to be placed on top of the two, namely heavy objects with a length greater than the hollow planar element 102 plus the hollow tail gate element 108. In one embodiment of the present invention, the interior of element 108 includes at least one railing or gutter for facilitating sliding of the element 110 within the element 108.

Figure 5:
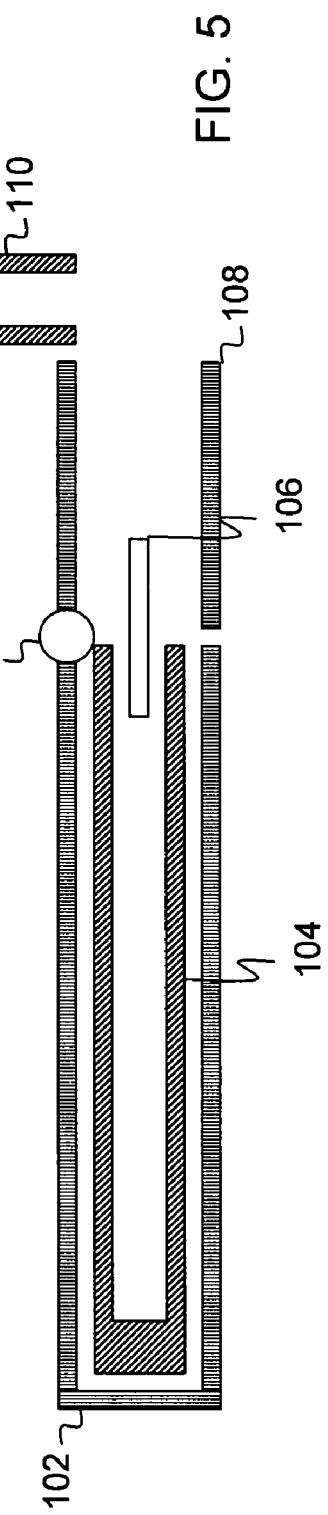
FIG. 5 is an illustration of a cross-sectional view of the truck bed system of FIG. 1 in an open position with the inner tail gate element pulled and rotated.

FIG. 5 is an illustration of a cross-sectional view of the truck bed system 100 of FIG. 1 in an open position with the inner tail gate element 110 pulled and rotated. The inner tail gate element 110 is rotated about a hinge (not shown) so as to be perpendicular to the hollow tail gate element 108 and the hollow planar element 102 when the hollow tail gate element 108 is coplanar to the hollow planar element 102. This arrangement allows the truck bed to be extended using the hollow tail gate element 108 with the added benefit of a perpendicular gate—the rotated inner tail gate element 110. This allows heavy objects to be placed on top of the hollow tail gate element 108, namely heavy objects with a length greater than the hollow planar element 102 plus the hollow tail gate element 108, while still providing a gate (i.e., the rotated inner tail gate element 110) which acts like a barrier that contains the load being carried. In one embodiment of the present invention, a locking mechanism is used to lock the element 110 in place.

Figure 6:
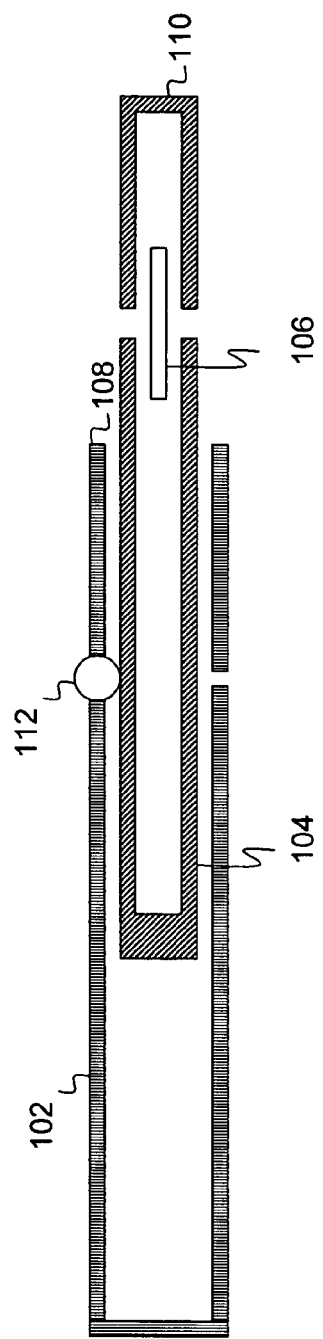
FIG. 6 is an illustration of a cross-sectional view of the truck bed system of FIG. 1 in an open position with the inner tail gate element and the inner planar element being pulled out.

FIG. 6 is an illustration of a cross-sectional view of the truck bed system 100 of FIG. 1 in an open position with the inner tail gate element 110 and the inner planar element 104 being pulled out. As shown in FIG. 6, the conjunction of the inner tail gate element 110 and the inner planar element 104 can be pulled out of the hollow planar element 102 and the hollow tail gate element 108 so as to provide a completely separate planar assembly that can be used as a ramp as described below. In one embodiment of the present invention, the interior of elements 102 and 108 include at least one railing or gutter for facilitating sliding of the elements 104 and 110 within the elements 102 and 108.

Figure 7:
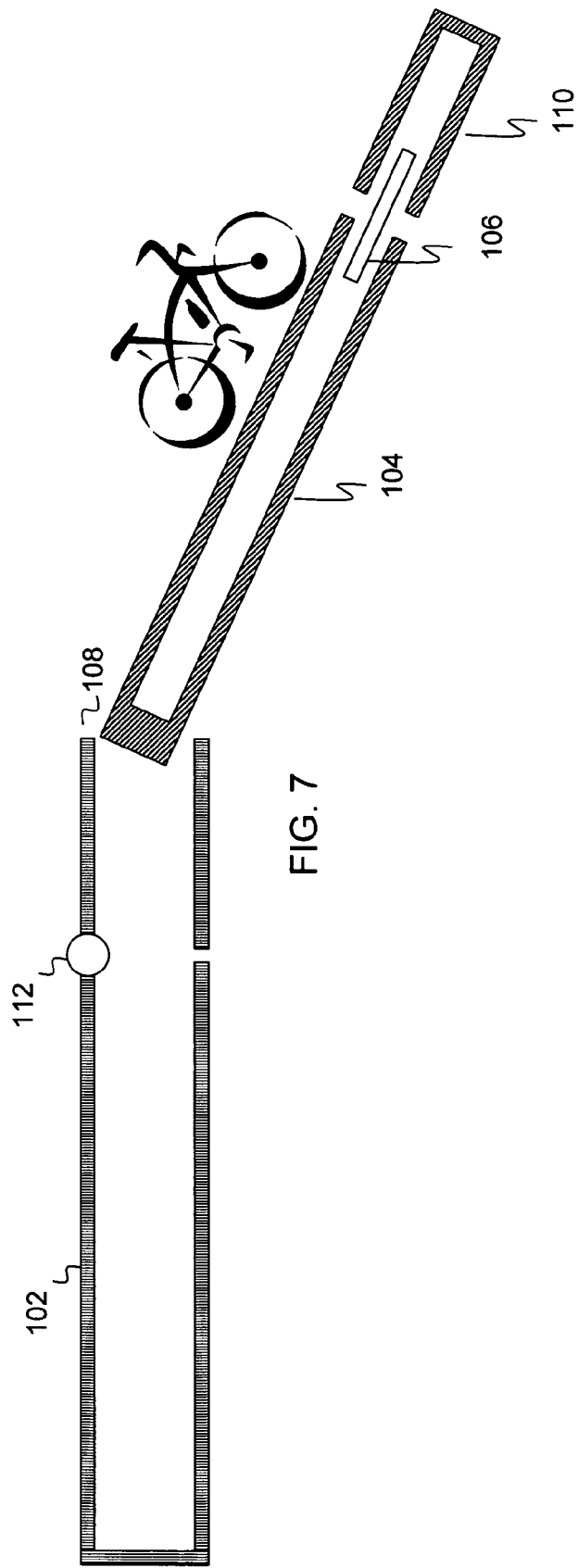
FIG. 7 is an illustration of a cross-sectional view of the truck bed system of FIG. 1 in an open position with the inner tail gate element and the inner planar element pulled out and rotated.

FIG. 7 is an illustration of a cross-sectional view of the truck bed system 100 of FIG. 1 in an open position with the inner tail gate element 110 and the inner planar element 104 completely pulled out and rotated. As shown in FIG. 7, the conjunction of the inner tail gate element 110 and the inner planar element 104 can be pulled out of the hollow planar element 102 and the hollow tail gate element 108 so as to provide a completely separate planar assembly that is rotated and used as a ramp to load materials onto the truck bed. In one embodiment of the present invention, a hinge or joint means couples the inner planar element 104 and the hollow tail gate element 108. In one embodiment of the present invention, a locking mechanism is used to lock the elements 104 and 110 in place.

Figure 8:
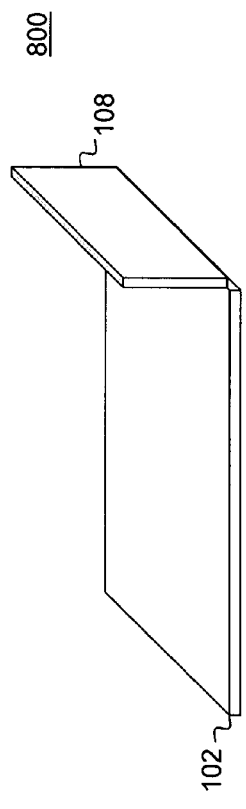
FIG. 8 is an illustration of a perspective view of a truck bed system according to one embodiment of the present invention.

FIG. 8 is an illustration of a perspective view of a truck bed system 800 according to one embodiment of the present invention. The truck bed system 800 is shown to be in the closed position as the hollow tail gate element 108 is rotated about a hinge (not shown) so as to be perpendicular to the hollow planar element 102, as when a tail gate is closed.

Figure 9:
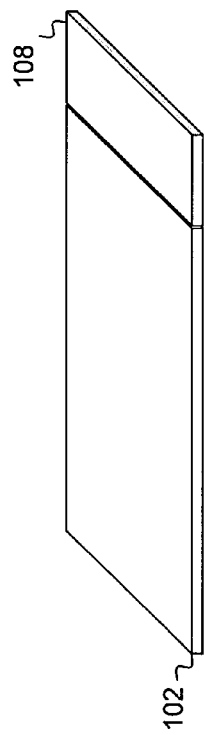
FIG. 9 is an illustration of a perspective view of the truck bed system of FIG. 8 in the open position.

FIG. 9 is an illustration of a perspective view of the truck bed system 800 of FIG. 8 in the open position. The truck bed system 800 is shown in FIG. 9 to be in the open position as the hollow tail gate element 108 is rotated about a hinge (not shown) so as to be coplanar to the hollow planar element 102, as when a tail gate is open.

FIG. 9 may further include a sliding planar element (not shown) positioned within the hollow tail gate element 108 and the hollow planar element 102, wherein when the hollow tail gate element 108 is coplanar with the hollow planar element 102, the sliding planar element may be positioned or slid within both the hollow tail gate element 108 and the hollow planar element 102 so as to provide stability to a junction of the two. This arrangement allows the truck bed to be extended using the hollow tail gate element 108, which is stabilized and/or strengthened so as to allow heavy objects to be placed on top of it, namely heavy objects with a length greater than the length of the truck bed (i.e., the length of the hollow planar element 102).

Figure 10:
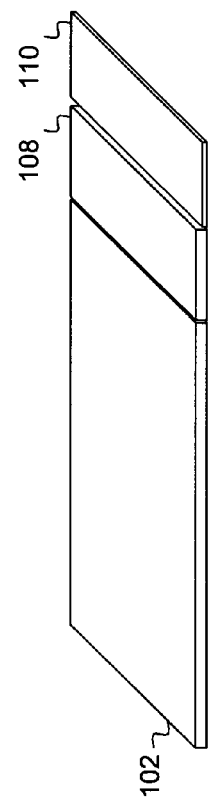
FIG. 10 is an illustration of a perspective view of the truck bed system of FIG. 8 in the open position with the inner tail gate element pulled out.

FIG. 10 is an illustration of a perspective view of the truck bed system 800 of FIG. 8 in the open position with the inner tail gate element 110 pulled out. FIG. 10 shows that the inner tail gate element 110 may be slid at least partially out of the second end of the hollow tail gate element 108 so as to extend the truck bed when the hollow tail gate element 108 is coplanar with the hollow planar element 102. The inner tail gate element 110 may further be pulled out and rotated. This arrangement allows the truck bed to be extended using the hollow tail gate element 108 and the inner tail gate element 110 so as to allow heavy objects to be placed on top of the two, namely heavy objects with a length greater than the hollow planar element 102 plus the hollow tail gate element 108.

Figure 11:
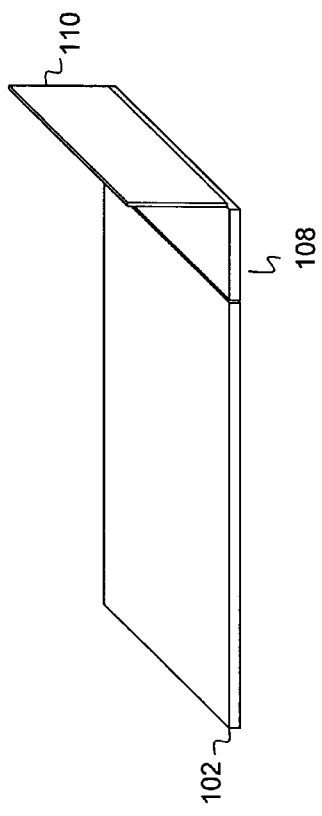
FIG. 11 is an illustration of a perspective view of the truck bed system of FIG. 8 in the open position with the inner tail gate element pulled out and rotated.

FIG. 11 is an illustration of a perspective view of the truck bed system 800 of FIG. 8 in the open position with the inner tail gate element 110 pulled out and rotated. The inner tail gate element 110 is rotated about a hinge (not shown) so as to be perpendicular to the hollow tail gate element 108 and the hollow planar element 102 when the hollow tail gate element 108 is coplanar to the hollow planar element 102. This arrangement allows the truck bed to be extended using the hollow tail gate element 108 with the added benefit of a perpendicular gate—the rotated inner tail gate element 110. This allows heavy objects to be placed on top of the hollow tail gate element 108, namely heavy objects with a length greater than the hollow planar element 102 plus the hollow tail gate element 108, while still providing a gate (i.e., the rotated inner tail gate element 110) which acts like a barrier that contains the load being carried.

Figure 12:
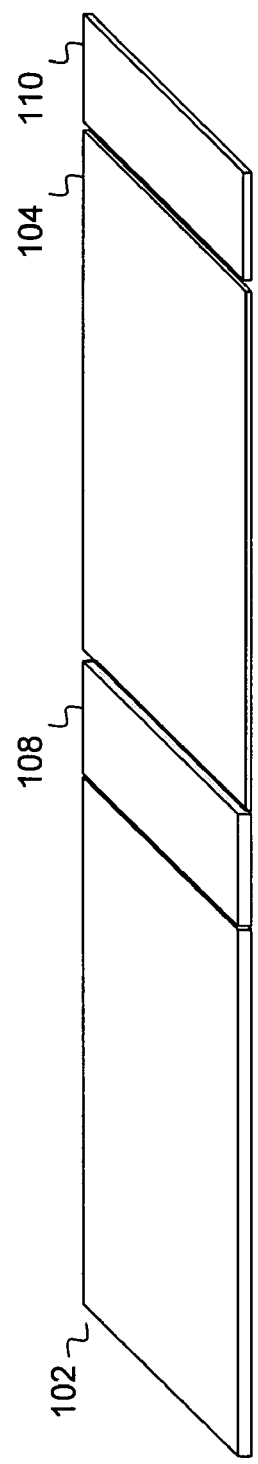
FIG. 12 is an illustration of a perspective view of the truck bed system of FIG. 8 in the open position with the inner tail gate element and the inner planar element pulled out.

FIG. 12 is an illustration of a perspective view of the truck bed system 800 of FIG. 8 in the open position with the inner tail gate element 110 and the inner planar element 104 pulled out. As shown in FIG. 12, the conjunction of the inner tail gate element 110 and the inner planar element 104 can be pulled out of the hollow planar element 102 and the hollow tail gate element 108 so as to provide a completely separate planar assembly that can be used as a ramp as described below.

Figure 13:
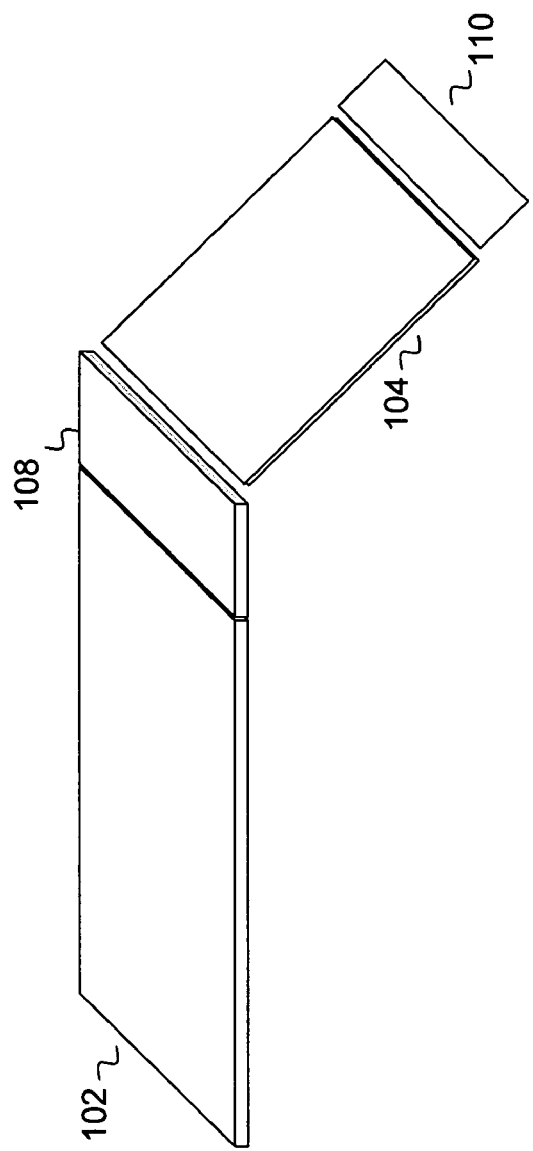
FIG. 13 is an illustration of a perspective view of the truck bed system of FIG. 8 in the open position with the inner tail gate element and the inner planar element pulled out and rotated.

FIG. 13 is an illustration of a perspective view of the truck bed system 800 of FIG. 8 in the open position with the inner tail gate element 110 and the inner planar element 104 pulled out and rotated. As shown in FIG. 13, the conjunction of the inner tail gate element 110 and the inner planar element 104 can be pulled out of the hollow planar element 102 and the hollow tail gate element 108 so as to provide a completely separate planar assembly that is rotated and used as a ramp to load materials onto the truck bed. In one embodiment of the present invention, a hinge or joint means couples the inner planar element 104 and the hollow tail gate element 108.

FIG. 14 is an illustration of a perspective view of a truck bed system 1400 according to one embodiment of the present invention. FIG. 14 shows the truck bed system 1400 in the open position with the inner tail gate element 110 and dual inner planar elements 1402 and 1404 pulled out. As shown in FIG. 14, the conjunction of the inner tail gate element 110 and the dual inner planar elements 1402 and 1404 can be pulled out of the hollow planar element 102 and the hollow tail gate element 108 so as to provide a completely separate planar assembly that can be used as a dual-element ramp as described below.

FIG. 15 is an illustration of a perspective view of the truck bed system 1400 of FIG. 14 in the open position with the inner tail gate element 110 and the dual inner planar elements 1402 and 1404 pulled out and rotated. As shown in FIG. 15, the conjunction of the inner tail gate element 110 and the dual inner planar elements 1402 and 1404 can be pulled out of the hollow planar element 102 and the hollow tail gate element 108 so as to provide a completely separate planar assembly that is rotated and used as a ramp to load materials onto the truck bed. In one embodiment of the present invention, hinge or joint means couple the dual inner planar elements 1402 and 1404 and the hollow tail gate element 108.

FIG. 16 is an illustration of a perspective view of a truck bed system according to one embodiment of the present invention. FIG. 16 shows a truck bed system, such as truck bed system 100, included with a conventional pick up truck 600. FIG. 16 shows that the inner tail gate element 110 may be slid at least partially out of the second end of the hollow tail gate element 108 so as to extend the truck bed when the hollow tail gate element 108 is coplanar with the hollow planar element 102. The inner tail gate element 110 may further be pulled out and rotated. This arrangement allows the truck bed to be extended using the hollow tail gate element 108 and the inner tail gate element 110 so as to allow heavy objects to be placed on top of the two, namely heavy objects with a length greater than the hollow planar element 102 plus the hollow tail gate element 108.

FIG. 17 is an illustration of a perspective view of the truck bed system of FIG. 16 in the open position with the inner tail gate element 110 and the inner planar element 104 pulled out. As shown in FIG. 17, the conjunction of the inner tail gate element 110 and the inner planar element 104 can be pulled out of the hollow planar element 102 and the hollow tail gate element 108 so as to provide a completely separate planar assembly that can be used as a ramp as described below.

Figure 18:
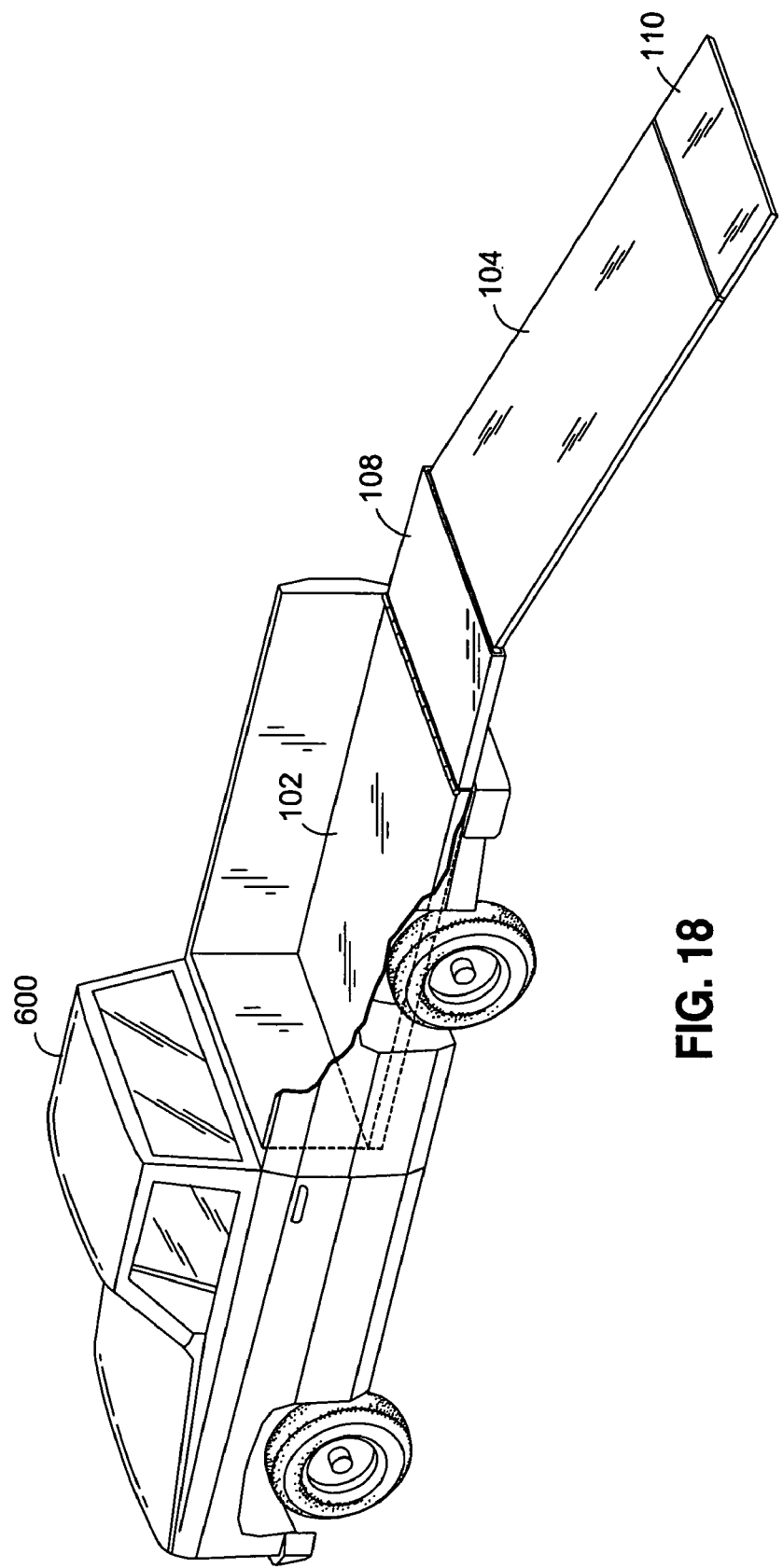
FIG. 18 is an illustration of a perspective view of the truck bed system of FIG. 16 in the open position with the inner tail gate element and the inner planar element pulled out and rotated.

FIG. 18 is an illustration of a perspective view of the truck bed system of FIG. 16 in the open position with the inner tail gate element 110 and the inner planar element 104 pulled out and rotated. As shown in FIG. 18, the conjunction of the inner tail gate element 110 and the inner planar element 104 can be pulled out of the hollow planar element 102 and the hollow tail gate element 108 so as to provide a completely separate planar assembly that is rotated and used as a ramp to load materials onto the truck bed. In one embodiment of the present invention, a hinge or joint means couples the inner planar element 104 and the hollow tail gate element 108.

The components of the truck bed systems 100, 800 and 1400 can be manufactured from a variety of materials using a variety of methods. In one embodiment of the present invention, the components of the truck bed systems 100, 800 and 1400, can be manufactured from aluminum or an aluminum alloy. Aluminum can be either non-treated, clear or color anodized. The aluminum alloys are categorized into two types, non-heat-treatable and heat-treatable.

Type 1100 non-heat-treatable aluminum alloys are commercially pure, low-strength alloys having corrosion resistance and satisfactory anodizing and coating finishes. Type 3003 non-heat-treatable aluminum alloys are the most widely used general-purpose alloys because of their corrosion resistance, moderate strength, formability, and weldability. Type 5005 non-heat-treatable aluminum alloys are comparable to Type 3003 in strength and formability, and have good finishing characteristics, making it much better for anodizing. They also exhibit corrosion resistance and weldability, but rates below Type 1100 and Type 3003 alloys for machining.

Type 5052 non-heat-treatable aluminum alloys are versatile high-strength alloys with good forming characteristics and excellent corrosion resistance. Although easily welded, they are not recommended for brazing and soldering applications. Type 2024 heat-treatable aluminum alloys are high-strength alloys with nearly twice the strength of Type 5052 and fair corrosion resistance. Type 6061 heat-treatable aluminum alloys are high-strength alloys that are corrosion resistant and have good finishing, and welding characteristics. Type 7075 heat-treatable aluminum alloys were developed for aircraft applications, and re one of the highest strength, commercially available alloys. They have fair corrosion resistance and machinability.

In another embodiment of the present invention, the components of the truck bed systems 100, 800 and 1400 can be manufactured from hot-forged alloy steel that is oil quenched and tempered for maximum strength and durability. Additionally, the components of the truck bed systems 100, 800 and 1400 may include nickel-chrome plating that resists rust. The components of the truck bed systems 100, 800 and 1400 can be welded or coupled together using an arc welding process such as heli-arc welding.

The components of the truck bed systems 100, 800 and 1400 can further be manufactured using a variety of methods for casting metals. Metal casting involves the shaping of free-flowing liquid metals through the use of dies, molds, or patterns. Castings are generally roughly finished due to the nature of their production. In many cases, additional finishing is required to remove burrs and other artifacts of the casting process. Metal castings are used to design a wide range of components and finished products. Common metal casting processes include sand casting, die casting, permanent mold casting, investment casting, centrifugal casting, and lost foam casting.

Die-casting includes a number of processes in which reusable dies or molds are used to produce casting. The die contains an impression of the finished product together with its running, feeding and venting systems. The die is capable of a regular cycle and of (quickly) dissipating the heat of the metal poured into it. Once the liquid metal has cooled sufficiently, the mold is opened and the casting can be removed and finished. In permanent mold casting, molten metal is poured into cast iron molds, coated with a ceramic mold wash. Cores can be metal, sand, sand shell, or other materials. When completed, the molds are opened and the castings are ejected.

Investment casting involves molding patterns by the injection of a special wax into a metal die. The patterns are assembled into a cluster around a wax runner system. The 'tree' of patterns is then coated with eight to ten layers of a refractory material. The assembly is heated to remove the wax. The hot mold is cast, and when cool, the mold material is removed by impact, vibration, grit blasting, high pressure water blasting or chemical dissolution leaving the castings, which are then removed from the runner system.

Centrifugal casting is used to produce castings that are cylindrical in shape. In centrifugal casting, a permanent mold is rotated about its axis at high speeds as the molten metal is poured. The molten metal is centrifugally thrown towards the inside mold wall, where it solidifies. The casting is usually a fine grain casting with a very fine-grained outer diameter, which is resistant to atmospheric corrosion. Lost foam casting is metal casting that uses foam filled patterns to produce castings. Foam is injected into a pattern, filling all areas, leaving no cavities. When molten metal is injected into the pattern, the foam is burned off allowing the casting to take shape.

The components of the systems 100, 800 and 1400 can further be manufactured using metal injection molding (MIM) method for preparing metals. MIM is a powder metallurgy process used for manufacturing metal parts. Although metal injection molding uses powder metal, it is nothing like conventional powder metal processing. The metal powders used in MIM are ten to one hundred times smaller than in powder metal processes. Also, the end product of metal injection molding is much higher in density (greater than 95% theoretical density). Unlike powder metal, products manufactured by MIM can be case or through hardened, painted, and drilled and tapped.

The components of the truck bed systems 100, 800 and 1400 can further be manufactured using a variety of metals, such as ferrous metals and alloys. Ferrous metals and alloys are iron-based materials that are used in a wide variety of industrial applications. Examples include carbon steels, alloy steels, stainless steels, tool steels, cast iron, cast steel, maraging steel, and specialty or proprietary iron-based alloys.

There are many types of ferrous metals and alloys. Carbon steels are ferrous alloys that contain carbon and small levels of other alloying elements such as manganese or aluminum. Alloy steels contain low to high levels of elements such as chromium, molybdenum, vanadium and nickel. Stainless steels are highly corrosion resistant, ferrous alloys that contain chromium and/or nickel additions. There are three basic types of products: austenitic stainless steels, ferritic and martensitic stainless steels, and specialty stainless steels and iron super-alloys. Tool steels are wear resistant, but difficult to fabricate in their hardened form. Specific grades are available for cold-working, hot-working, and high speed applications. Cast iron is a ferrous alloy with high amounts of carbon. This category includes ductile iron, gray iron and white cast iron grades. Cast steel alloy grades are made by pouring molten iron into a mold.

The components of the truck bed systems 100, 800 and 1400 can further be manufactured using nickel and nickel alloys. Nickel and nickel alloys are non-ferrous metals with high strength and toughness, excellent corrosion resistance, and superior elevated temperature properties. Commercially pure, unalloyed or very low alloy nickel does not contain or contains only very small amounts of alloying elements. By contrast, nickel alloys contain significant amounts of added elements or constituents. Clad or bimetal stock consists of two different alloys that are bonded integrally together. Metal matrix composites have a composite or reinforced metal or alloy matrix filled with a second component, which may be in particulate, chopped fiber, continuous filament, or fabric form. Other unlisted, specialty or proprietary nickel and nickel alloys are also available. These materials are often based on a unique alloy system, use a novel processing technology, or have properties tailored for specific applications.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A system for facilitating loading and placement of materials onto a truck bed, comprising:
    a hollow planar element disposed on the truck bed;
    a hollow tail gate element having a first end and a second end, wherein the hollow tail gate element is hingably coupled on the first end to the hollow planar element;
    an inner planar element positioned within the hollow planar element; and
    an inner tail gate element positioned within the hollow tail gate element, wherein the inner tail gate element is hingably coupled to the inner planar element,
    wherein the inner tail gate element may be slid partially out of the second end of the hollow tail gate element so as to extend the truck bed when the hollow tail gate element is coplanar with the hollow planar element.

2. The system of claim 1, further comprising:
    a hinge for coupling the inner tail gate element to the inner planar element, wherein when the inner tail gate element is slid out of the second end of the hollow tail gate element, the inner tail gate element may be rotated perpendicular to the hollow tail gate element so as to extend the truck bed when the hollow tail gate element is coplanar with the hollow planar element.

3. The system of claim 2, further comprising:
    a sliding planar element positioned within the inner planar element and the inner tail gate element, wherein when the hollow tail gate element is coplanar with the hollow planar element, the sliding planar element may be positioned within both the inner planar element and the inner tail gate element so as to provide stability to a junction of the inner planar element and the inner tail gate element.

4. The system of claim 1, further comprising:
    a hinge for coupling one end of the inner planar element to the hollow tail gate element, such that the inner tail gate element and the inner planar element may be slid out of the second end of the hollow tail gate element and remain hingably coupled to the hollow tail gate element, and wherein the inner planar element may be rotated about the hinge so as to provide a ramp.

5. The system of claim 4, further comprising:
    a sliding planar element positioned within the inner planar element and the inner tail gate element, wherein when the hollow tail gate element is coplanar with the hollow planar element, the sliding planar element may be positioned within both the inner planar element and the inner tail gate element so as to provide stability to a junction of the inner planar element and the inner tail gate element.

6. The system of claim 1, wherein the hollow planar element is a rectangular metallic element positioned on top of the truck bed.

7. The system of claim 6, wherein the hollow tail gate element is a rectangular metallic element emulating a tail gate.

8. The system of claim 7, wherein the inner planar element is a rectangular metallic element substantially occupying an inner volume of the hollow planar element.

9. The system of claim 8, wherein the inner tail gate element is a rectangular metallic element substantially occupying an inner volume of the hollow tail gate element.

10. A system for facilitating loading and placement of materials onto a truck bed, comprising:
- a rectangular planar element having an inner cavity, wherein the rectangular planar element is disposed on the truck bed;
- a tail gate element having an inner cavity and an opening providing access to the inner cavity, wherein the tail gate element is hingably coupled to the rectangular planar element;
- a sliding planar element positioned within the rectangular planar element; and
- a first sliding tail gate element positioned within the tail gate element, wherein the first sliding tail gate element is hingably coupled to the sliding planar element, wherein the first sliding tail gate element may be slid partially out of the opening of the tail gate element so as to extend the truck bed when the tail gate element is coplanar with the rectangular planar element.

11. The system of claim 10, further comprising:
a hinge for coupling the first sliding tail gate element to the sliding planar element, wherein when the first sliding tail gate element is slid out of the opening of the tail gate element, the first sliding tail gate element may be rotated perpendicular to the tail gate element so as to extend the truck bed when the tail gate element is coplanar with the rectangular planar element.

12. The system of claim 11, further comprising:
a rigid sliding planar element positioned within the sliding planar element and the first sliding tail gate element, wherein when the tail gate element is coplanar with the rectangular planar element, the rigid sliding planar element may be positioned within both the sliding planar element and the first sliding tail gate element so as to provide stability to a junction of the sliding planar element and the first sliding tail gate element.

* * * * *